United States Patent Office 3,043,881
Patented July 10, 1962

1

3,043,881
NOVEL HALOGEN-CONTAINING ETHER ALCOHOLS
Marco Wismer, Richland Township, Pa., assignor to Pittsburgh Plate Glass Company, Allegheny County, Pa., a corporation of Pennsylvania
No Drawing. Filed Jan. 22, 1958, Ser. No. 710,401
9 Claims. (Cl. 260—613)

This invention relates to novel halogen containing compounds useful in the preparation of epoxy resins, polyester resins, and other materials, and pertains more particularly to compounds obtained by the reaction of glycidyl ethers of halophenols with alcohols.

U.S. Patent No. 2,221,771 describes the preparation of compounds of the general structure

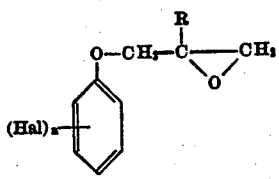

wherein Hal represents halogen, $n$ represents a whole number from 3 to 5 inclusive, and R represents hydrogen or a lower alkyl radical. Compounds of the foregoing structure are prepared by first forming an aqueous solution of an alkali metal salt of a halophenol, and adding this salt incrementally to a molecular excess of a propylene oxide such as 1-chloro-propylene-oxide - 2,3, or 1-chloro-2-methyl-propylene-oxide-2,3 with stirring at temperatures between about 60° C. and the refluxing temperature of the reaction mixture. The mixture is thereafter warmed until the reaction is substantially complete, after which the reaction mixture is cooled, and the crude ether product separated by extraction, decantation, filtration, or the like. Upon fractional distillation of the crude product, the desired halophenyl ether is obtained in substantially pure form.

It has now been discovered that the compounds thus obtained will react with aliphatic alcohols, particularly aliphatic polyols, in the presence of a Friedel-Crafts type catalyst to form nearly quantitative yields of compounds having the following structure:

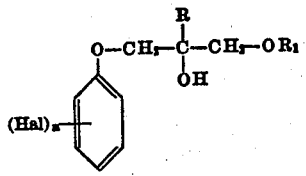

wherein $R_1$ is a radical derived by removing a hydroxyl group from an aliphatic alcohol, preferably one having the structure $R_1(OH)_m$ as defined hereinbelow, and R, Hal, and $n$ have the significance given hereinabove.

The reaction whereby the above compounds are obtained is believed to proceed substantially in accordance with the following equation:

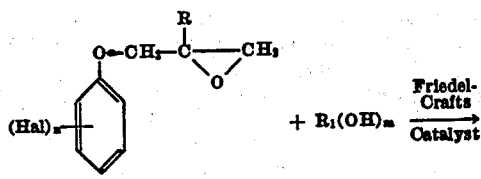

2

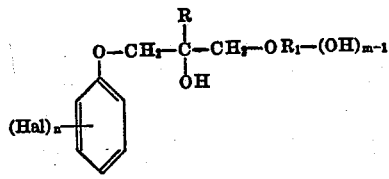

Any aliphatic polyol having the structure $R_1(OH)_m$, wherein $R_1$ is an aliphatic radical, and preferably an aliphatic hydrocarbon radical such as alkylene, $R_1$ may also be a radical of the structure —$R_3$—O—$R_3$—, wherein each $R_3$ is alkylene may be used. $m$ is a whole number from 1 to 5, but preferably is from 2 to 5. The polyol residue contains one less hydroxyl group than the free polyol due to the opening of the epoxide group and subsequent formation of the ether linkage across one of the hydroxyl groups of the polyol. This change in the number of hydroxyl groups is graphically depicted in the above equation by the structure —$(OH)_{m-1}$. Included in the preferred group of alcohols are the polyols such as ethylene glycol, diethylene glycol, propylene glycol, 1,4-butanediol, trimethylol ethane, trimethylol propane, trimethylol hexane, trimethylol heptane, 1,2,6-hexanetriol, pentaerythritol, dipentaerythritol, sorbitol, (1,2,3,4,5,6-hexanehexol), and the like. Monohydric alcohols such as methanol, ethanol, propanol, isopropanol, butanol, and pentanol, preferably those in which the alkyl group is a lower alkyl group, may also be employed with good results.

The preferred compound of the structure:

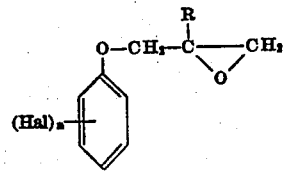

for use in preparing the novel compounds of this invention is pentachlorophenyl glycidyl ether which possesses the following structure:

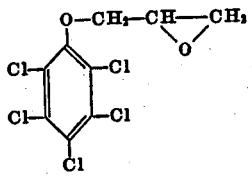

This compound can readily be prepared by the reaction of pentachlorophenol with epichlorohydrin, both of which are relatively inexpensive, commercially available products. However, other compounds of this general type, that is, those in which fewer than 5 chlorine atoms are present on the phenolic nucleus, or where the chlorine is replaced by another halogen atom, or where the radical R represents a lower alkyl group instead of hydrogen, can also be employed in the reaction.

As indicated hereinabove, a Friedel-Crafts compound is utilized as a catalyst for the reaction. Included among these catalysts are the following:

Aluminum chloride
Boron trifluoride
Sulfuric acid
Phosphorus pentoxide
Antimony pentachloride
Ferric chloride
Tellurium dichloride Stannic chloride
Titanium tetrachloride
Concentrated phosphoric acid
Tellurium tetrachloride
Bismuth trichloride
Zinc chloride Of the foregoing compounds, stannic chloride has been found to catalyze the reaction very effectively, and yields of at least 95 percent of the desired product are invariably obtained.

In addition to the Friedel-Crafts compounds per se, it is also possible to employ many of these compounds, for example, boron trifluoride and aluminum chloride, in the form of their alcoholates or etherates. These complexes are also very useful catalysts.

Only very small amounts of catalyst are necessary, and it is ordinarily desirable to utilize from about 0.1 percent to 5.0 percent by weight of catalyst based on the total weight of the reactants. While larger amounts can be employed, no particular advantage is obtained, and in some instances it may be uneconomical to utilize large amounts.

Preferably, the reaction is carried out employing some excess of the alcohol, although the reaction proceeds satisfactorily if stoichiometric amounts are utilized. Best results are obtained when the glycidyl ether reactant is added slowly to the alcohol reactant. The reaction tends to be slightly exothermic, but ordinarily it is desirable to heat the reaction mixture to a temperature in the range of 100° C. to 140° C. during the reaction period, normally from about 1 to 4 hours. If the alcohol utilized is a liquid, no solvent need be employed; however, if the alcohol is a solid, it is desirable to employ a solvent such as the type normally employed with Friedel-Crafts catalysts, for example, carbon tetrachloride and the like.

The desired product can be recovered from the reaction mixture very simply by distilling off the solvent, if one is used, and the excess alcohol, if any. Purification of the product can be achieved by crystallization from a solvent.

The following examples illustrate in detail the preparation of the novel compounds of this invention. The examples are not intended to limit the invention, however, inasmuch as there are many obvious alterations and modifications.

Example I

Four hundred (400) grams of ethylene glycol and 2 grams of stannic chloride were placed in a glass reactor equipped with condenser, stirrer, and temperature measuring means. To this mixture was added 161 grams of pentachlorophenyl glycidyl ether over a period of 45 minutes during which time the temperature was increased from 60° C. to about 105° C. After the addition was complete, the temperature was maintained at about 120° C. for an additional 1½ hours.

The excess ethylene glycol was then removed by vacuum distillation. The reaction product solidified in a period of about 15 hours to a white crystalline product. The product was recrystallized from a mixture of benzene and heptane, with the pure product melting at 94.5° C.–95° C.

The product, identified as 1-pentachlorophenoxy-2-hydroxy-3-betahydroxyethoxy-propane had the following analysis:

|  | Theory | Found |
| --- | --- | --- |
| Carbon | 34.33 | 34.16 |
| Hydrogen | 2.86 | 2.88 |
| Chlorine | 46.16 | 46.06 |

Example II

Two hundred thirty (230) grams of absolute ethanol and 4 grams of stannic chloride were charged into a glass reactor equipped with condenser, agitator and temperature measuring means. One hundred sixty-one (161) grams of pentachlorophenyl glycidyl ether was added in 8 equal portions over a period of 2½ hours, the temperature being maintained in the range of 71° C. to 78° C. The reaction mixture was then refluxed for an additional 3 hours, after which it was filtered and the excess ethanol removed by distillation. One hundred seventy-nine and six tenths (179.6) grams of 1-pentachlorophenoxy-2-hydroxy-3-ethoxy-propane (97.6 percent of theory) was obtained. This compound possesses the following structure:

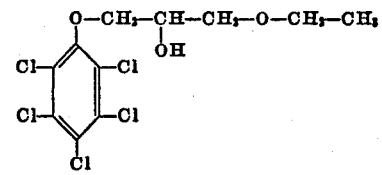

The theoretical hydroxyl equivalent for this material is 152.5, and the hydroxyl value determined by analysis was 152.7. Analysis:

|  | Theory | Found |
| --- | --- | --- |
| Carbon | 35.82 | 35.93 |
| Hydrogen | 2.99 | 3.05 |
| Chlorine | 48.17 | 48.18 |

Example III

Eight hundred (800) grams of 1,4-butanediol and 4 grams of stannic chloride were charged into a glass reactor equipped with condenser, agitator and temperature measuring means. To this mixture 332 grams of pentachlorophenyl glycidyl ether was added in 8 equal portions over a period of 1½ hours, the temperature being maintained in the range of about 92° C. to 103° C., after which the reaction mixture was refluxed for an additional 5 hours at a temperature of about 130° C., with 2 additional grams of stannic chloride being added during the refluxing period. The reaction mixture was then filtered and the excess 1,4-butanediol removed by distillation. Three hundred ninety-two and one tenth (392.1) grams (95.3 percent of theory) of 1-pentachlorophenoxy-2-hydroxy-3-delta-hydroxybutoxy-propane was obtained. This compound has the following structure:

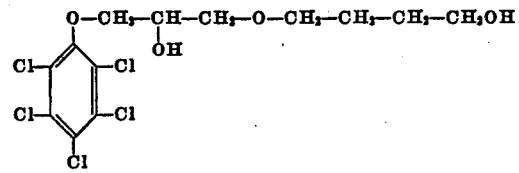

The hydroxyl number of the product was 277.4, the theoretical hydroxyl value being 272.

Example IV

Seven hundred fifty-one (751) grams of triethylene glycol and 2 grams of stannic chloride were charged into a glass reactor equipped with condenser, stirrer and temperature measuring means. One hundred sixty-one (161) grams of pentachlorophenyl glycidyl ether was added in 6 equal portions over a period of 45 minutes, the temperature being maintained in the range of 92° C. to 100° C. during the addition period. The reaction mixture was then refluxed for an additional 2 hours at a temperature of about 123° C. The reaction mixture was then filtered to remove excess triethylene glycol. Fifty (50) percent yield (119 grams) of 1-(pentachlorophenoxy-methyl)-3,6,9-trioxa-1,11-undecanediol having the structure:

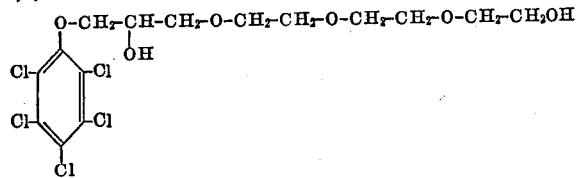

was obtained. The product had a hydroxyl value of 229.1, the theoretical value being 231.

The following example represents the preparation of an epoxy resin employing the novel compounds of this invention as a starting material.

Example V

Five hundred forty-two (542) grams of 1-pentachlorophenoxy-2-hydroxy-3-beta - hydroxyethoxy-propane, 910 grams of epichlorohydrin and 6 grams of caustic soda were admixed in a glass reactor equipped with a condenser, stirrer and temperature measuring means. The resulting mixture was refluxed at 100° C., with the remaining caustic soda being added in equal portions at 20 minute intervals. The reaction mixture was neutral approximately 3 hours after the final addition of caustic soda. The reaction mixture was filtered, and the excess epichlorohydrin removed by distillation. An 84.5 percent yield of a resin having an epoxy equivalency of 309.2 was obtained.

This epoxy resin was then cured with methylene dianiline. A hard, non-fusible resin having flame retardant properties was obtained.

The following example illustrates the preparation of a self-extinguishing polyester resin utilizing the compound of Example I.

Example VI

Seventy-three (73) grams of maleic anhydride and 300 grams of 1 - pentachlorophenoxy-2-hydroxy-3-beta-hydroxyethoxypropane were charged into a glass reactor equipped with an agitator, temperature measuring means and an azeotropic separator. The mixture was heated to a temperature of 180° C. to 190° C. and toluene was added to provide a reflux medium. The mixture was reacted until an acid value of 38.0 was obtained, after which the solvent was removed by blowing with an inert gas.

One hundred fifty (150) grams of the polyester resin thus obtained was admixed with 50 grams of styrene and 0.03 gram of hydroquinone. The mixture was then catalyzed with 1 percent benzoyl peroxide, and a casting made. The casting was cured for 1 hour at 70° F. and an additional hour at 78° F. The casting had a flexural strength of 13,800 and a modulus of $4.83 \times 10^5$ p.s.i. When tested by A.S.T.M. method D635–44 the casting had a flame resistance of 7.8 seconds.

Although specific examples of the invention have been set forth hereinabove, it is not intended that the invention be limited solely thereto, but to include all of the variations and modifications falling within the scope of the appended claims.

I claim:

A compound of the structure

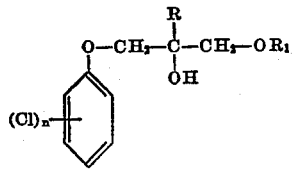

wherein $n$ represents a whole number from 3 to 5 inclusive, $R_1$ is a radical derived by removing one hydroxyl group from a saturated polyol consisting of from 2 to 10 carbon atoms, hydrogen and oxygen, and from 2 to 5 hydroxyl groups, and R is a member of the class consisting of hydrogen and lower alkyl radicals.

2. 1-pentachlorophenoxy-2-hydroxy - 3 - beta-hydroxyethoxy-propane.

3. 1-pentachlorophenoxy-2-hydroxy-3-delta - hydroxybutoxy-propane.

4. 1-(pentachlorophenoxy-methyl) - 3,6,9 - trioxa-1,11-undecanediol.

5. The method which comprises reacting a compound of the structure

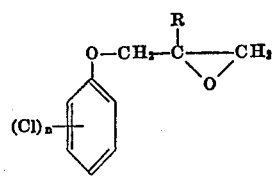

wherein R is a member of the class consisting of hydrogen and lower alkyl radicals, and $n$ represents a whole number from 3 to 5 inclusive, with a saturated polyol consisting of from 2 to 10 carbon atoms, hydrogen and oxygen, and from 2 to 5 hydroxyl groups, in the presence of a Freidel-Crafts catalyst, thereby to obtain a compound of the structure

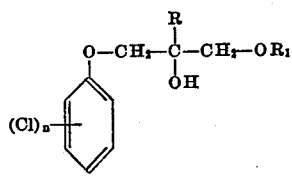

wherein R is a member of the class consisting of hydrogen and lower alkyl radicals, $R_1$ is the radical derived by removing a single hydroxyl group from said saturated polyol consisting of from 2 to 10 carbon atoms, hydrogen and oxygen, and from 2 to 5 hydroxyl groups, and $n$ has the significance set forth above.

6. The method of claim 5 wherein R represents hydrogen and Hal represents chlorine.

7. The method of claim 6 wherein pentachlorophenyl glycidyl ether is reacted with ethylene glycol, the compound obtained being 1-pentachlorophenoxy-2-hydroxy-3-beta-hydroxyethoxy-propane.

8. The method of claim 6 wherein pentachlorophenyl glycidyl ether is reacted with 1,4-butanediol, the compound obtained being 1-pentachlorophenoxy-2-hydroxy-3-delta-hydroxybutoxy-propane.

9. A method which comprises reacting pentachlorophenyl glycidyl ether with triethylene glycol in the presence of a Friedel-Crafts catalyst, thereby obtaining 1 (pentachloro-phenoxy-methyl)-3,6,9 - trioxa - 1,11 - undecanediol.

References Cited in the file of this patent

UNITED STATES PATENTS

| | | |
|---|---|---|
| 2,221,771 | Alquist et al. | Nov. 19, 1940 |
| 2,416,263 | MacMullen | Feb. 18, 1947 |
| 2,428,235 | Marple et al. | Sept. 30, 1947 |

OTHER REFERENCES

Marle: Jour. Chem. Soc., Vol. 101 (1912), page 30 (1 page).

Weinman et al.: Jour. Econ. Entomol., Vol. 40 (1947) pages 74–79 (6 pages).

Yale et al.: 72 Jour. Amer. Chem. Soc. (1950), page 3712–3713 (2 pages).